United States Patent
Kim et al.

(10) Patent No.: US 7,940,502 B2
(45) Date of Patent: May 10, 2011

(54) BACKLIGHT UNIT HAVING PROTECTION CIRCUIT USING CENTER-TAP

(75) Inventors: Hyo Young Kim, Gyunggi-do (KR); Jong Rak Kim, Gyunggi-do (KR); Sung Hun Oh, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 280 days.

(21) Appl. No.: 12/191,122

(22) Filed: Aug. 13, 2008

(65) Prior Publication Data
US 2009/0154043 A1    Jun. 18, 2009

(30) Foreign Application Priority Data

Dec. 12, 2007    (KR) ......................... 10-2007-0128909

(51) Int. Cl.
*H02H 3/00* (2006.01)
(52) U.S. Cl. ......................................................... 361/88
(58) Field of Classification Search .................. 361/88; 363/75; 315/224, 308, 291, 86, 168, 307
See application file for complete search history.

(56) References Cited

U.S. PATENT DOCUMENTS

| | | | |
|---|---|---|---|
| 6,472,876 B1 | 10/2002 | Notohamiprodjo et al. | |
| 7,075,245 B2* | 7/2006 | Liu | 315/219 |
| 2002/0047619 A1* | 4/2002 | Oura et al. | 315/276 |
| 2008/0079440 A1 | 4/2008 | Lee et al. | |

FOREIGN PATENT DOCUMENTS
KR    10-2008-0029188 A    4/2008
* cited by examiner

*Primary Examiner* — Jared J Fureman
*Assistant Examiner* — Angela Brooks
(74) *Attorney, Agent, or Firm* — Lowe Hauptman Ham & Berner LLP

(57) ABSTRACT

There is provided a backlight unit having a protection circuit using a center-tap, the backlight unit including: a current balancing unit including a plurality of primary coils individually transmitting the lamp driving power from an inverter unit to the lamps, and a plurality of secondary coils each formed of one conductor having a center-tap, and receiving an electromagnetically induced voltage from each of the plurality of primary coils, the one end and the center-tap of each of the plurality of secondary coils connected in series with the one end and the center-tap of the neighboring secondary coil to form at least one closed loop and maintain current transmitted to each of the lamps balanced; a sensing unit sensing a variation in current of the closed loop and a variation in current of the primary coil from the current balancing unit; and a determination unit determining whether each of the lamps performs an abnormal operation or not.

7 Claims, 2 Drawing Sheets

BACKLIGHT UNIT HAVING PROTECTION CIRCUIT USING CENTER-TAP

CROSS-REFERENCE TO RELATED APPLICATIONS

This application claims the priority of Korean Patent Application No. 2007-0128909 filed on Dec. 12, 2007, in the Korean Intellectual Property Office, the disclosure of which is incorporated herein by reference.

BACKGROUND OF THE INVENTION

1. Field of the Invention

The present invention relates to a backlight unit having a protection circuit, and more particularly, to a backlight unit having a protection circuit that can protect lamps or an inverter in the event of lamp failure by sensing an abnormal voltage by using center-taps of secondary coils of a current balancing circuit that maintains current in each lamp balanced.

2. Description of the Related Art

Recently, as compared to existing display devices, LCD display devices that can be reduced in size and thickness have attracted attention. In particular, among the LCD display devices, an LCD TV has much attention. The LCD display device includes a backlight unit that emits light.

FIG. 1 is a configuration view illustrating a backlight unit according to the related art.

Referring to FIG. 1, a backlight unit according to the related art includes an inverter 10, a current balancing circuit 20, a lamp group 30, a sensing circuit 40, and a determination circuit 50. The inverter 10 converts DC power to AC power that is required to drive lamps. The current balancing circuit 20 includes a plurality of current balancing transformers that maintain alternating current, supplied from the AC power from the inverter 10, balanced. The lamp group 30 includes a plurality of lamps each of which receives the AC power from a secondary coil of each of the current balancing transformers of the current balancing circuit 20. The sensing circuit 40 senses voltages on the basis of the amount of current flowing into the lamps by a plurality of resistors and diodes that are individually connected to primary coils of the current balancing circuit 20. The determination 50 compares the voltage sensed by the sensing circuit 40 with a predetermined reference voltage and determines an abnormal operation in each of the lamps.

The backlight unit according to the related art includes the current balancing circuit 20 that has the current balancing transformers each of which includes the primary coil and the secondary coil having a predetermined winding ratio therebetween in order to maintain the amount of current flowing into the lamps constant. The primary coils of the above-described current balancing circuit 20 transmit the lamp driving power from the inverter 10 to corresponding lamps LAMP1 to LAMP4, respectively. The amount of current induced in the secondary coils is constantly maintained when each of the lamps of the lamp group 30 operates a normal operation. When each lamp performs an abnormal operation, that is, an open-circuit or a short-circuit occurs, the amount of current in the corresponding secondary coils increases to maintain current in each lamp balanced.

The above-described sensing circuit 40 senses a voltage on the basis of the amount of current in the secondary coil that changes according to the operation of the lamp. As described above, in order to maintain current balance, the secondary coil is electrically connected to another secondary coil of the neighboring current balancing transformer to thereby form one loop. Since the voltage sensed on the basis of the amount of current of the secondary coils has no big difference from a sensed voltage in a normal state because of the function of maintaining current balance that operates when each lamp performs an abnormal operation, such as an open-circuit or a short-circuit, it is difficult to sense lamp failures.

SUMMARY OF THE INVENTION

An aspect of the present invention provides a backlight unit having a protection circuit using a center-tap that can protect lamps or an inverter in the event of lamp failure by detecting an abnormal voltage by using center-tabs of secondary coils of current balancing transformers maintaining current in lamps balanced.

According to an aspect of the present invention, there is provided a backlight unit having a protection circuit using a center-tap, the backlight unit including: an inverter unit supplying lamp driving power; a lamp group including a plurality of lamps receiving the lamp driving power from the inverter unit and emitting light; a current balancing unit including a plurality of primary coils individually transmitting the lamp driving power from the inverter unit to the plurality of lamps, and a plurality of secondary coils each formed of one conductor having one end, the other end formed at an opposite side of the one side, and a center-tap between the one end and the other end, and each receiving an electromagnetically induced voltage from each of the plurality of primary coils, the one end and the center-tap of each of the plurality of secondary coils connected in series with the one end and the center-tap of the neighboring secondary coil to form at least one closed loop and maintain current transmitted to each of the lamps balanced; a sensing unit sensing a variation in current of the closed loop and a variation in current of the primary coil from the conductor ranging from the center-tap and the other end of the secondary coil of the current balancing unit; and a determination unit comparing a sensed voltage from the sensing unit with a predetermined reference voltage and determining whether each of the lamps performs an abnormal operation or not.

Each of the plurality of primary coils and each of the plurality of secondary coils may electromagnetically correspond to each other to form a coil pair.

The primary coil and the secondary coil forming the coil pair may include one transformer.

The sensing unit may include a plurality of resistors individually connected to the other ends of the secondary coils and connected in common to the ground; and a plurality of diodes individually connected to the other ends of the secondary coils and rectifying the sensed voltages.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. However, in description of operation principles associated with the embodiments of the present invention, detailed description of a known art or configuration is omitted because it may obscure the spirit of the present invention unnecessarily.

Figure 1:
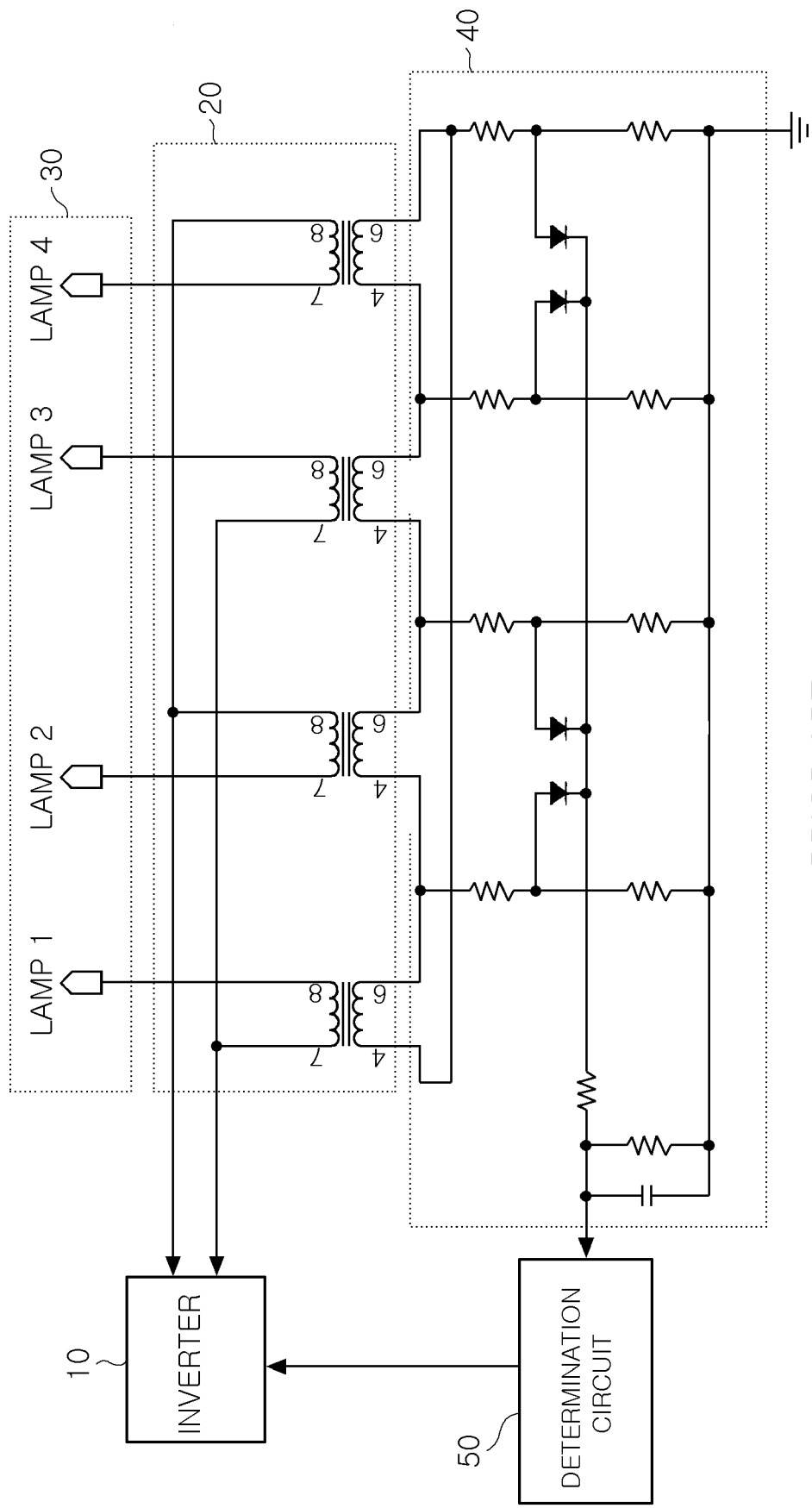
FIG. 1 is a configuration view illustrating a backlight unit according to the related art.
Figure 2:
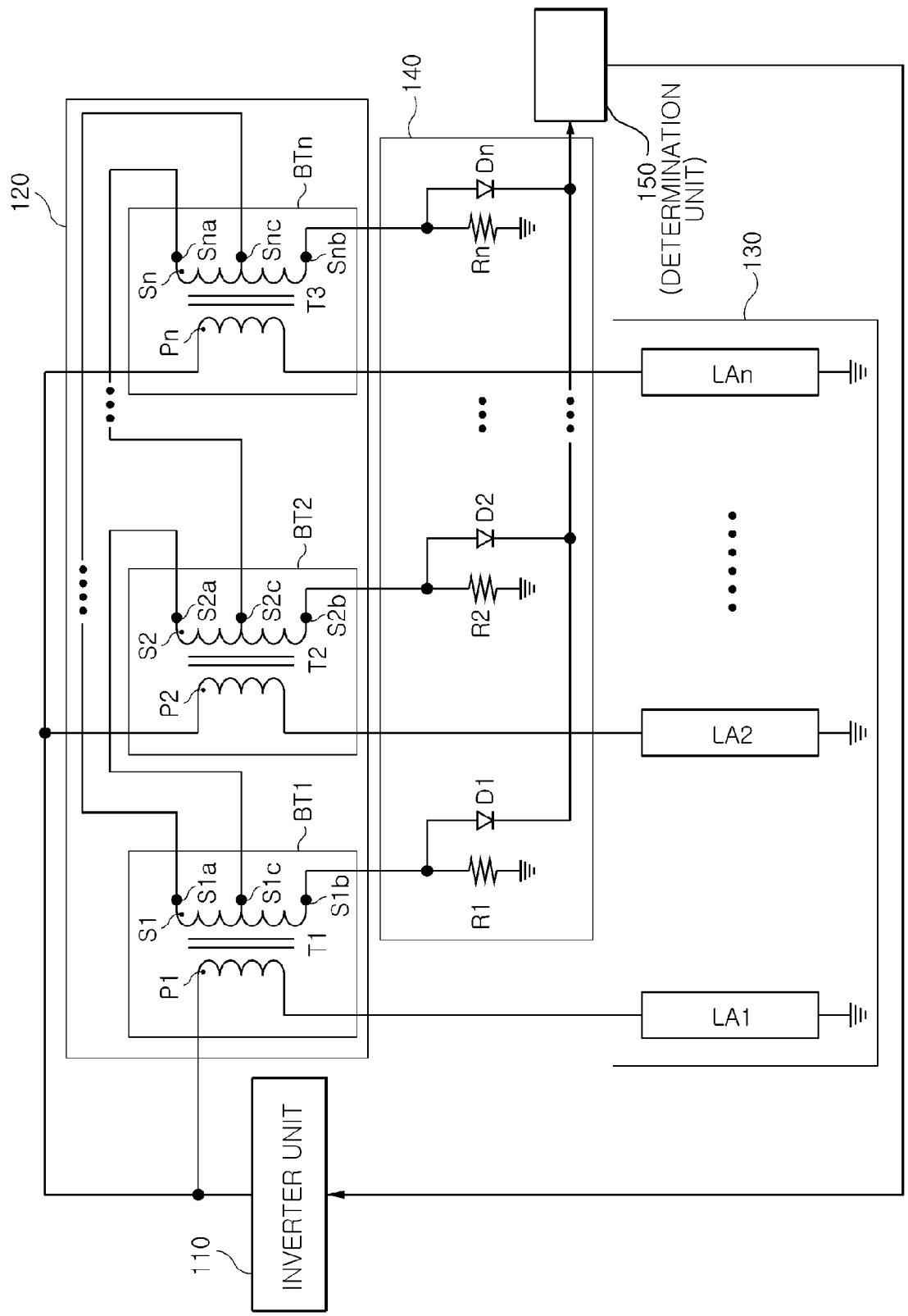
FIG. 2 is a configuration view illustrating a backlight unit according to an exemplary embodiment of the present invention.

FIG. 2 is a view illustrating a configuration of a backlight unit according to an exemplary embodiment of the invention.

Referring to FIG. 2, a backlight unit 100 according to an exemplary embodiment of the invention includes an inverter unit 110, a current balancing unit 120, a lamp group 130, a sensing unit 140, and a determination unit 150.

The inverter unit 110 receives DC power, converts the DC power to AC power V+ and V− that is required to drive lamps. Though not shown, the inverter unit 110 preferably includes a switch that switches the DC power, a power converting transformer that converts the switched power to the AC power, and a controller the switching operation of the switch.

The current balancing unit 120 receives the AC power from the inverter unit 110, maintains current balance, and transmits the AC power to the lamp group 130.

The current balancing unit 120 includes a plurality of current balancing transforms BT1, BT2, and BTn. Preferably, the number of current balancing transformers is the same as the number of lamps that are included in the lamp group 130.

The current balancing transforms BT1, BT2, and BTn include primary coils P1, P2, and Pn and secondary coils S1, S2, and Sn, respectively, which are formed of conductors.

One end of each of the primary coils P1, P2, and Pn is connected to each of the lamps of the lamp group 130. The other end of each of the primary coils P1, P2, and Pn is connected to the inverter unit 110 and receives the lamp driving power. The primary coils P1, P2, and Pn transmit the lamp driving power from the inverter unit 110 to the corresponding lamps of the lamp group 130.

The secondary coils S1, S2, and Sn includes one set of ends S1a, S2a, and Sna, the other set of ends S1b, S2b, and Snb, and center-taps S1c, S2c, and Snc that are formed between the one set of ends and the other sets of ends, respectively.

The secondary coils S1, S2, and Sn receive power from the primary coils P1, P2, and Pn, respectively, and maintain the current, transmitted to the lamps, balanced.

To this end, the secondary coils are connected to each other to form one closed loop.

That is, the secondary coil S1 of the first transformer BT1 is connected in series with the secondary coil S2 of the second transformer BT2, and in this way, connected to the secondary coil Sn of the n-th transformer BTn in the same way. The secondary coil Sn of the n-th transformer BTn is connected in series with the secondary coil S1 of the first transformer BT1 to form one closed loop.

At this time, the above-described closed loop is formed by connecting the one set of ends S1a, S2a, and Sna and the center-taps S1c, S2c, and Snc of the secondary coils S1, S2, and Sn to each other.

The other set of ends S1b, S2b, and Snb of the respective secondary coils S1, S2, and Sn are electrically connected to the sensing unit 140. Therefore, the sensing unit 140 receives the changed current from the closed loop and the current induced in each of the primary coils P1, P2, and Pn from each of the conductors between the center-taps S1c, S2c, and Snc and the other set of ends S1b, S2b, and Snb of the respective secondary coils S1, S2, and Sn, and senses a voltage on the basis of the transmitted currents.

The lamp group 130 includes a plurality of lamps. Preferably, the number of lamps is the same as the number of current balancing transformers.

The sensing unit 140 includes a plurality of resistors R1, R2, and Rn and a plurality of diodes D1, D2, and Dn. The resistors R1, R2, and Rn sense voltages on the basis of the current transmitted from the conductors between the center-taps S1c, S2c, and Snc and the other set of ends S1b, S2b, and Snb of the respective secondary coils S1, S2, and Sn of the current balancing unit 120. Each of the diodes D1, D2, and Dn rectifies the voltage detected by each of the resistors R1, R2, and Rn.

The plurality of resistors R1, R2, and Rn are electrically connected between the other set of ends S1b, S2b, and Snb of the secondary coils S1, S2, and Sn and the ground, respectively. Anodes of the D1, D2, and Dn are electrically connected to the plurality of resistors R1, R2, and Rn and connection terminals of the other set of ends S1b, S2b, and Snb of the secondary coils S1, S2, and Sn, respectively. Cathodes of the diodes D1, D2, and Dn are electrically connected to the determination unit 150.

The determination unit 150 receives the sensed voltages from the plurality of diodes D1, D2, and Dn of the sensing unit 140 and a predetermined reference voltage and transmits determination voltages to the inverter unit 110. Preferably, the determination voltage is transmitted to the controller of the inverter unit 110 and may be used to control the switching operation of the inverter unit 110.

Hereinafter, the operation and effect of the invention will be described in detail with reference to the accompanying drawings.

First, the inverter unit 110 converts the DC power into lamp driving power used to drive the lamps, and the lamp driving power is transmitted to the current balancing unit 120.

The primary coils P1, P2, and Pn and the secondary coils S1, S2, and Sn that are included in the current balancing transforms BT1, BT2, and BTn of the current balancing current balancing unit 120 have predetermined winding ratios therebetween. The lamp driving power from each of the primary coils P1, P2, and Pn is transmitted to each of the lamps. The AC power is induced in each of the secondary coils S1, S2, and Sn according to the winding ratio to thereby maintain current balance.

The one set of ends S1a, S2a, Sna and the center-taps S1c, S2c, and Snc of the plurality of secondary coils S1, S2, and Sn are electrically connected to each other to form one closed loop and maintain the current, transmitted to the respective lamps through the primary coils P1, P2, and Pn, balanced.

Each of the lamps of the lamp group 130 receives the lamp driving power and emits light. At this time, at least one of the lamps may perform an abnormal operation, such as an open-circuit or a short-circuit, during an initial operation when power is input or during a normal operation where the lamp emits light.

Since the primary and secondary coils have the predetermined winding ratio, when the lamp performs the normal operation, each of the secondary coils S1, S2, and Sn maintains current balance so that the current induced in each of the primary coils P1, P2, and Pn remains constant. This is why the lamp has constant impedance on the average when the lamp performs the normal operation.

On the other hand, when at least one of the lamps performs the abnormal operation, the impedance of the lamp performing the abnormal operation becomes different from that of the lamp performing the normal operation.

Therefore, the amount of current of the primary coil corresponding to the lamp performing the abnormal operation becomes different from that of the primary coil corresponding to the lamp performing the normal operation. Further, the amount of current generated in the closed loop of the secondary coils also changes.

Therefore, the amount of current induced between the center-tap and the other set of end of the secondary coil is the sum of a variation in current of the above-described primary coil and a variation in the current of the closed loop of the secondary coils.

The sensing unit 140 senses a voltage on the basis of the current induced in the center-tap and the other end of each of the secondary coils.

As described above, when at least one of the lamps performs an abnormal operation, the amount of current of the primary coil corresponding to the lamp performing the abnormal operation becomes different from that of the primary coil corresponding to the lamp performing the normal operation.

A high voltage different from a voltage generated when the lamp performs a normal operation may be sensed from the conductor between the center-tap and the other end of the secondary coil that electromagnetically corresponds to the primary coil whose current amount changes and the closed loop of the secondary coils whose current amount changes according to the abnormal operation of the lamp. To this end, the resistors R1, R2, and Rn are electrically connected between the other set of ends of the secondary coils and the ground, respectively.

The high voltage may vary according to the predetermined winding ratio set between the primary coil and the secondary coil.

The voltage from the conductor between the center-tap and the other end of each of the secondary coils is an AC voltage. The diodes D1, D2, and Dn that are connected to the other set of ends of the secondary coils in a forward direction, respectively, rectify the AC voltage and cut off the current flowing inversely through the loop.

The sensed voltage from each of the plurality of secondary coils is transmitted to each of the diodes D1, D2, and Dn, and the sensed voltage rectified by each of the diodes is transmitted to the determination unit 150.

The determination unit 150 receives the predetermined reference voltage and the sensed voltage from the sensing unit 140, compares the reference voltage and the sensed voltage, and determines whether the lamp performs a normal or abnormal operation.

When the sensed voltage is smaller than the reference voltage, the determination unit 150 determines that the lamp performs a normal operation. When the sensed voltage is larger than the reference voltage, the determination unit 150 determines that the lamp performs an abnormal operation and outputs a corresponding determination voltage.

The determination unit 150 transmits the determination voltage to the inverter unit 110.

The controller of the inverter unit 110 receives the determination voltage of the determination unit 150 and switches off to thereby cut off the supply of the AC power to the lamp.

As set forth above, according to an exemplary embodiment of the invention, an increase in current of the primary coil and an increase in current of the secondary coil are sensed as a voltage by using center-taps of the secondary coil of the current balancing transformers to make a clear difference between a sensed voltage when the lamp performs a normal operation and a sensed voltage when the lamp performs an abnormal operation, such that an abnormal operation of the lamp can be easily sensed to thereby protect the lamp and the inverter.

While the present invention has been shown and described in connection with the exemplary embodiments, it will be apparent to those skilled in the art that modifications and variations can be made without departing from the spirit and scope of the invention as defined by the appended claims.

What is claimed is:

1. A backlight unit having a protection circuit using a center-tap, the backlight unit comprising:
    an inverter unit supplying lamp driving power;
    a lamp group including a plurality of lamps receiving the lamp driving power from the inverter unit and emitting light;
    a current balancing unit including a plurality of primary coils individually transmitting the lamp driving power from the inverter unit to the plurality of lamps, and a plurality of secondary coils each formed of one conductor having one end, the other end formed at an opposite side of the one side, and a center-tap between the one end and the other end, and each receiving an electromagnetically induced voltage from each of the plurality of primary coils, the one end and the center-tap of each of the plurality of secondary coils connected in series with the one end and the center-tap of the neighboring secondary coil to form at least one closed loop and maintain current transmitted to each of the lamps balanced;
    a sensing unit sensing a variation in current of the closed loop and a variation in current of the primary coil from the conductor ranging from the center-tap and the other end of the secondary coil of the current balancing unit; and
    a determination unit comparing a sensed voltage from the sensing unit with a predetermined reference voltage and determining whether each of the lamps performs an abnormal operation or not.

2. The backlight unit of claim 1, wherein each of the plurality of primary coils and each of the plurality of secondary coils electromagnetically correspond to each other to form a coil pair.

3. The backlight unit of claim 2, wherein the primary coil and the secondary coil forming the coil pair comprise one transformer.

4. The backlight unit of claim 3, wherein the sensing unit comprises:
    a plurality of resistors individually connected to the other ends of the secondary coils and connected in common to the ground; and
    a plurality of diodes individually connected to the other ends of the secondary coils and rectifying the sensed voltages.

5. A backlight unit, comprising:
    an inverter unit for supplying lamp driving power;
    a lamp group including a plurality of lamps coupled to the inverter unit for receiving the lamp driving power from the inverter unit and for emitting light;
    a current balancing unit including
        a plurality of primary coils each of which is coupled to and between the inverter unit and a respective one of the lamps for individually transmitting the lamp driving power from the inverter unit to the respective lamp, and
        a plurality of secondary coils each of which has opposite first and second ends and a middle point between the first and second ends, and is coupled to receive an electromagnetically induced voltage from a respective one of the primary coils, wherein
        each said secondary coil includes a first conductor part defined between the first end and the middle point, and a second conductor part defined between the second end and the middle point, and the first conductor parts of said secondary coils are connected in series with each other to form a closed loop for maintaining a current flowing to each of the lamps balanced;

a sensing unit coupled to the second ends of the secondary coils for sensing, from the second conductor parts of the secondary coils, current variations in the closed loop and in said primary coils; and a determination unit coupled to the sensing unit for comparing a sensed voltage from the sensing unit with a predetermined reference voltage and determining whether each of the lamps performs an abnormal operation or not.

6. The backlight unit of claim 5, wherein each of the primary coils and the respective secondary coil are electromagnetically coupled to each other to form a transformer.

7. The backlight unit of claim 6, wherein the sensing unit comprises:

a plurality of resistors each of which is individually connected between (i) the second end of one of the secondary coils and (ii) a common ground; and a plurality of diodes each of which is individually connected between (a) the second end of one of the secondary coils and (b) the determination unit.

* * * * *